Jan. 31, 1939.          A. WESSIG            2,145,502
                   INDICATOR FOR VEHICLES
                   Filed June 22, 1935      2 Sheets-Sheet 1
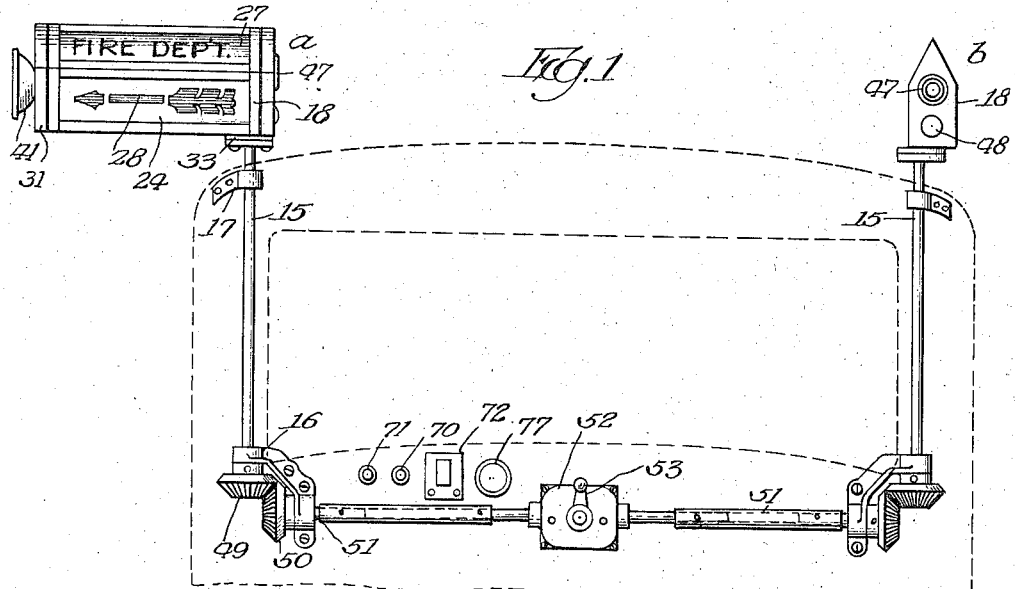
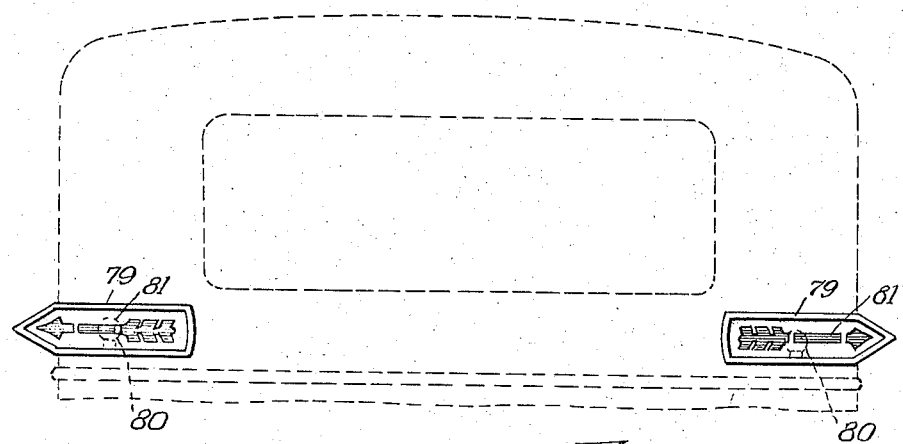
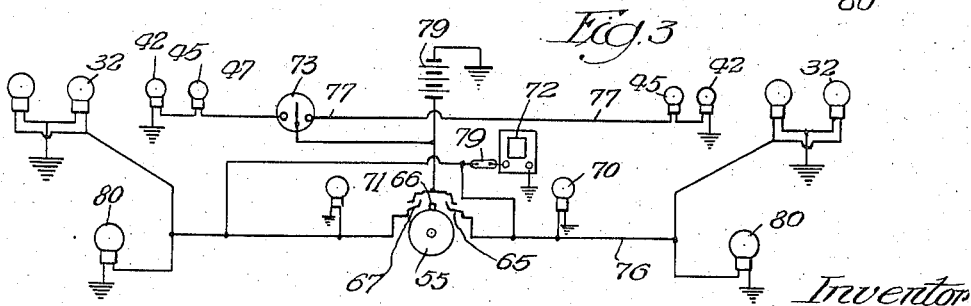

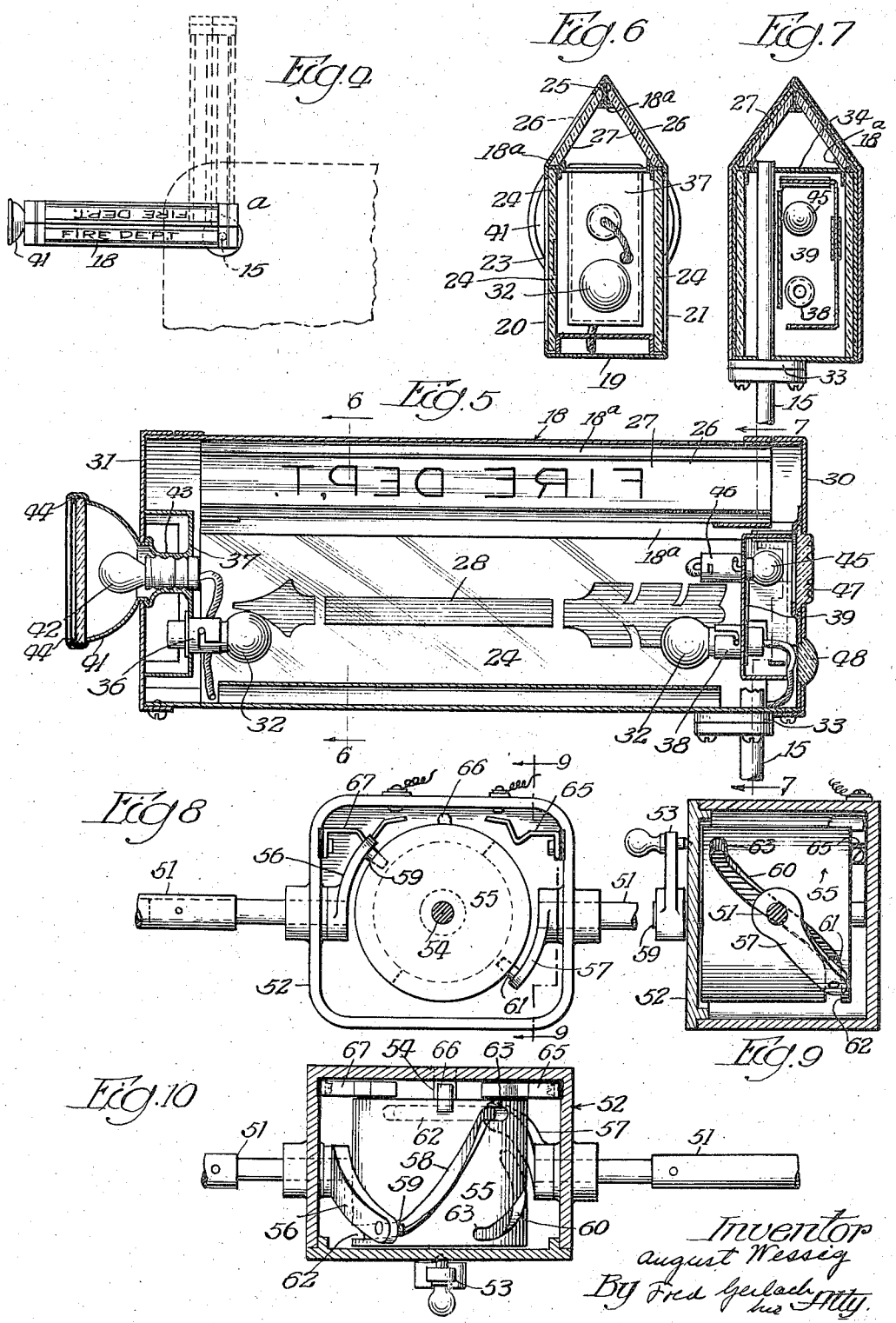

Patented Jan. 31, 1939

2,145,502

UNITED STATES PATENT OFFICE 2,145,502

INDICATOR FOR VEHICLES

August Wessig, Chicago, Ill.

Application June 22, 1935, Serial No. 28,027

3 Claims. (Cl. 177—327)

The invention relates to devices for use on road vehicles for indicating contemplated changes of direction.

The objects of the invention are: to provide an improved signaling device which will strikingly indicate the contemplated change in direction by horizontally swinging movement of the signaling devices; to provide an improved device for indicating signals ahead and behind the vehicle; to provide a device which will indicate the character of the vehicle where desired, such as when the signal devices are used on fire-extinguishing vehicles, ambulances, or where vehicles have the right of way over other vehicles; to provide an improved indicator for contemplated changes in direction, which is located where it will attract attention when operated; to provide an improved indicator for road vehicles which includes lights for indicating that the vehicle is parked; and to provide simple and efficient means for selectively shifting and controlling the indicators. Other objects of the invention will appear from the detailed description.

The invention consists in the several novel features which are hereinafter set forth and more particularly defined by claims at the conclusion hereof.

In the drawings which accompany and form a part of this specification or disclosure and in which like numerals of reference denote corresponding parts through the several views: Fig. 1 is a view illustrating the invention applied to a vehicle with one of the indicators shifted to signal a direction-change. Fig. 2 is a rear elevation of a vehicle body illustrating the indicators on the rear of the vehicle body. Fig. 3 is a diagram of the electrical connections for the lights for illuminating the indicators. Fig. 4 is a plan of one of the horizontally rotatable indicators illustrating, by full and dotted lines, its normal and operative positions. Fig. 5 is a vertical longitudinal section of one of the horizontally swinging rotatable indicators. Fig. 6 is a section on line 6—6 of Fig. 5. Fig. 7 is a section on line 7—7 of Fig. 5. Fig. 8 is an elevation of the manually operable device for shifting the indicators and controlling the circuits for the lamps thereof, the cover plate being removed. Fig. 9 is a vertical section on line 9—9 of Fig. 8. Fig. 10 is a horizontal section on line 10—10 of Fig. 9.

The invention is exemplified in a system comprising a pair of indicators $a$ and $b$, which are mounted at the front and over the top of the vehicle and are adapted to swing horizontally to project laterally from the body to indicate direction-changes. When the invention is applied to a vehicle with a closed body, indicated by dotted lines in Fig. 1, these signaling devices are pivotally supported at points adjacent the front corners and over the top of the body so as normally to extend longitudinally of the vehicles and overlie the body without projecting laterally therefrom. Each of these indicators is elongated and pivotally supported adjacent one of its ends so it can be swung horizontally to project laterally and outwardly from one side of the vehicle body to indicate a change in direction. These indicators $a$ and $b$ are similar in construction so that a description of one is applicable to both.

Each of these indicators $a$ and $b$ is supported on a vertical shaft 15 which is journaled in suitable lower and upper bearing-brackets 16 and 17, which are secured to suitable parts of the vehicle, such as the stiles at the sides of the front of a closed body, or the standards for supporting the windshield of an open type vehicle. Each indicator comprises an elongated box or frame 18, which contains the lamps for illuminating the direction-changes and running or parking lights. Each box 18 is elongated and comprises a bottom 19, vertical sides 20 and 21, each of which is provided with an elongated rectangular opening 23 for a vertical translucent panel 24 and upwardly convergent roof or inclined portions 25 above the sides 20, 21. Each inclined portion 25 is provided with an elongated opening 26 for a translucent panel 27. Panels 24 are each provided with a direction-indicating arrow 28 and preferably these arrows are of different colors, such as red and green, so that the direction indication at the back of the vehicle will be indicated by a red arrow and the arrow at the front will be green to differentiate the front from the back of the vehicle. These panels are contrastingly colored from the arrows and translucent around the arrow to produce a striking or impressive signal when the box is illuminated from within, as hereinafter described. The inclined panels 27 at the top of the box are used to indicate the character of the vehicle. For example, if the indicators are used on a fire-extinguishing equipment, these panels 27 will be marked "Fire Dept.," or when used on an ambulance or on a private vehicle, they will be correspondingly marked. These panels 27 are translucent so that the markings will be clearly visible and strikingly impressive when the lights in the box are on. These panels make it possible for pedestrians and the drivers of other vehicles to observe from the indicators whether or not the vehicle carrying the indicator is entitled to the right of way over other vehicles. The panels 23, 24 and 25 are removably held on the inside of the box by ribs 18a between which the panels can be inserted endwise.

The bottom of each box 18 is fixedly secured to its supporting shaft 15 adjacent the corner thereof. These shafts are positioned adjacent the front corners of the vehicle body. When the indicators are in their normal position or are inoperative to indicate a direction-change, they extend longitudinally of the body of the vehicle and project forwardly from the shafts. When either indicator is swung horizontally and rearwardly through an arc of substantially 90°, as the indicator a shown in Fig. 4, the panels 24, 27 will project laterally from and extend transversely of the vehicle and be clearly visible from the sides, rear and front. One end of each box 18 is closed by a head or cap 30 and its other end by a cap 31. These caps are flanged to fit over the end portion of the body of the box and are removably secured thereto by screws to provide access to the lamps in the housing when replacement of the lamps or panels is necessary or desirable.

A pair of lamps 32, one adjacent each end, is provided in each box 18 to illuminate the panels 23, 24 and 27 when a direction-change is indicated. A pair of these lamps is provided in separate circuits so that in event one of the lamps should become worn out these panels will be illuminated by the other. These lamps are actuated only when the indicators are operated for a direction-change, as hereinafter set forth.

The bottom of each box 18 has fixedly secured thereto a plate 33, which is rigidly secured to one of the vertical shafts 15, so that rotation of the shaft will swing the box horizontally. Each shaft 15 extends upwardly into the box and through a crossbar 34 fixed to the sides of the box to prevent the upper portion of the box, which is preferably formed of thin sheet metal, from bending relatively to the base.

One of the lamps 32 is mounted in a socket 36, which is fixed in a plate 37, which extends across the outer end of the box and is fixed to cap 31. The lamp 32 at the inner end of the box is mounted in a socket 38 which is fixed in a plate 39 which is removably secured to the cap 30.

A lamp 42 is provided at the outer end of box 18. This lamp is held in a socket 43 in plate 37, so that the bulb thereof is disposed in a conical reflector-shell 41 which projects from the outer end of the box and is provided with a glass plate 40. This plate faces forwardly when the box is in its normal position to provide a light which is visible from the front of the vehicle while the vehicle is traveling or at rest, and toward the side when the indicator is swung into indicating position. Plate 40 is removably held in shell 41 by a split-ring 44 so that access may be had to the lamp 42 for removal when replacement is necessary.

A lamp 45 is carried in a lamp socket 46 in plate 39 adjacent the inner end of the box which normally faces rearwardly. This lamp illuminates a glass plate 47 mounted in the adjacent box end and also a small lens 48 to provide colored lights which are visible from the rear while the box is in its normal or nondirection-indicating position. This plate and lens may be of different colors, such as red and green, to correspond to the distinctive colors used in different services. Reflector-shells 41 and lamps 42 may be used at both ends of the box for private vehicles. Lamps 42 and 45 may be continuously actuated, at night, as parking or running lights. Plates 37 and 39 cut off the light from lamps 42, 45, so the latter do not illuminate the panels in the sides and top of the box.

This indicator exemplifies one which is adapted, in its normal position longitudinally of the vehicle body, to indicate by the differently colored lights at the back and front thereof, the direction in which the vehicle is traveling and which, when swung laterally, indicates to the front and rear of the vehicle the direction of travel in contemplation. The panels 23, 24 and 27 are colored so that the arrows and markings thereon are visible in daylight.

Manually operable mechanism is provided for selectively rotating the shafts 18 for the indicators a, b to operate one or the other according to the direction to be indicated. This mechanism comprises a beveled gear 49 fixed to the lower end of each shaft 15, a beveled gear 50 meshing with one of the gears 49 and rotatable through a shaft 51 and a device for rotating the shafts 51 contained in a box 52, which is mounted on the instrument-board or panel of the vehicle in front of the driver's seat. This shifting device comprises a crank-handle 53 on the back side of, and journaled in, the box 52 and fixed to a shaft 54, a drum 55 fixed to and rotatable by shaft 54 and crank 53, an arm 56 fixed to the shaft 51 for operating the indicator a at the left side of the vehicle, an arm 57 secured to the inner end of shaft 51 for operating the indicator b at the right side of the vehicle, a cam groove 58 into which is extended a pin 59 on the distal end of arm 56 for shifting said arm upon rotation of the drum 53 in one direction from its normal position, and a cam groove 60 into which extends a pin 61 fixed in the distal end of arm 57 for rotating shaft 51 upon rotation of the drum in the other direction. These cam grooves are formed to operate the indicators a, b independently, so that when the indicator a at the left side of the vehicle is operated to indicate a turn to the left, the indicator b at the right side will remain in normal position and vice versa. For this purpose, one end of each of the grooves 58, 60 terminates in a circumferential portion 62. This causes one of the arms 56, 57 to be rotated while the other is locked against rotation so that when a turn in one direction is indicated the indicator at the side toward which the turn is to be made will be rotated while the indicator at the other side will be locked against rotation. The opposite end of each of the cam-grooves 58, 60 terminates in a short circumferential portion 63 to lock the arms and the indicators controlled thereby.

The operation of indicators a, b will be as follows: when a turn is to be made to the left, the driver will swing crank-handle 53 to the left approximately a quarter revolution. This will rotate drum 55 so that cam groove 58 will rock arm 56 to swing the left-hand indicator a from the longitudinal position shown in dotted lines in Fig. 4 to the transverse position shown in full lines. During this rotation the pin 61 on the arm 57 will ride in the circumferential portion 62 of groove 60 and be held against rotation so the right-hand indicator b will be locked in its normal position. When the crank-handle 53 is turned to the right approximately a quarter revolution, cam groove 60 will rotate arm 57 to swing the right-hand indicator b to its transverse direction-indicating position and the straight portion at one end of cam groove 58 will engage the pin 59 on arm 56 to hold the left-hand indicator a in its normal or longitudinal position. Return movement of the crank-handle 53 from either of the positions to which it is shifted will operate the shifted arm and indicator to normal position.

In order to provide for actuating the lamps 32 for illuminating the direction-indicators only when they are operated into signaling position, switch mechanism is provided which is controlled by the manually shifted arm 53. This mechanism includes a normally open switch 65 adapted to be engaged by an abutment 66 on the drum to close a circuit for actuating the lamps 32 of the right-hand indicator b when the crank-handle 53 is correspondingly turned and a normally open switch 67 adapted to be closed by abutment 66 when the crank-handle 53 is turned to shift the left-hand indicator b into signaling position. A battery 74 and a conductor 75 serve to deliver current to the stationary contacts of the switches 65 and 67. The movable contact of the switch 65 is connected by a conductor 76 to the lamps 32 of the indicator B and the movable contact of the switch 67 is connected by a conductor 76ª to the lamps 32 of the indicator A. Current from the battery 74 is supplied to the lamps 42 and 45 by means of a conductor 77. The latter leads from the conductor 75 and is provided with a pair of branches which lead one to the lamps 42 and 45 of the indicator A and the other to the lamps 42 and 45 of the indicator B.

The electrical equipment is illustrated in Fig. 3 and comprises in addition to the battery 74 and the conductors 75, 76ª and 77 a pair of signal lamps 70, 71, which are included in the circuits for lamps 32 and serve visually to indicate on the dashboard when the lamps 32 in the indicators a and b are actuated. A switch 73 is provided for separately controlling the front and rear lamps 45, 47 in the boxes 18 of the indicators a and b, respectively, so that they can be separately used as parking or running lights when desired independently of the lamps 32. This switch is included in the conductor 77 and as shown in Figure 1 is mounted on the dashboard of the vehicle with which the system is used.

When the crank-handle 53 is turned to the right to indicate a right-hand turn, the indicator b will be swung horizontally from its fore and aft position to its transverse position projecting outwardly from the side of the vehicle so that the elongated sides and top will be visible from the front and rear of the vehicle. Near the end of the turn of the crank-handle, abutment 66 will close switch 65 to establish a circuit from battery 74 through conductor 75, switch 65, conductor 76 and the lamps 32 in the indicator b to illuminate the panels 24, 27 thereof for directional indications. These lamps 32 will remain actuated until crank-handle 53 is shifted to its normal position after the turn has been made. When the vehicle is to be turned to the left the operator will shift handle 53 to the left horizontally to rotate the left-hand indicator a and simultaneously abutment 66 will close switch 67 to close a circuit similar to that described for the right-hand indicator which will actuate the lamps 32 in the latter until the handle 53 is restored to normal position. Lamps 45 and 42 of the indicators, respectively, are controlled by the switch 73 so the signals at the front and rear of either indicator a—b may be kept illuminated while the vehicle is running or parked, or cut off, as desired by the operator.

If desired, either of the indicators a, b may be shifted into transverse position so that lamps 42 will serve as a spot-light for house numbers or road signs.

If desired, direction-signaling devices may also be provided on the rear of a body of a closed vehicle, as illustrated in Fig. 2. Each of these devices consists of a box 79 provided at its back face with a translucent plate with an arrow 81 thereon and containing a lamp 80. These lamps 80 are connected to the respective circuits for the corresponding front indicators a—b, so the front and rear signaling devices at either side of the vehicle will be simultaneously illuminated.

The invention exemplifies improved elongated direction-signaling devices for vehicles, which swing horizontally from a longitudinal position to a transverse laterally projecting position, with lamps which are actuated simultaneously with the movement of the devices, so that the signals will be impressive and striking in character to impress the drivers of other vehicles. This renders the indicators extremely effective. It also provides a box for the signaling device which can be utilized, simultaneously with the direction-indications, for indicating the character of the vehicle carrying the signals, so that other vehicles will give away to a vehicle entitled to the right of way. It also exemplifies visible means for indicating to the driver that the direction-signaling devices are actuated and an audible signal for reminding the driver to leave the indicators a, b in their shifted positions only as long as necessary.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with an automobile having a source of current and a body, of an elongated box-like indicating device at one side of the body, adapted normally to extend lengthwise of the body and having illuminable direction indicating means at the sides thereof and also having an independent electric lamp at its front end, an electric light disposed in the device between said direction indicating means and adapted in response to flow of current therethrough to illuminate said means, a pivotal mount whereby said device may be swung from its normal position into a direction indicating position wherein it extends transversely of the vehicle body, and the direction indicating means face forwardly and rearwardly and the lamp faces sidewise of and away from the body, mechanism for swinging said device between its two positions, switch controlled means for automatically supplying current from the aforesaid source to the electric light for illuminating the direction indicating means, and separate switch controlled means for supplying current from said source to the electric lamp at the front end of the device.

2. The combination with an automobile having a source of current and a body, of an elongated box-like indicating device at one side of the body, adapted normally to extend longitudinally of the body and having illuminable direction indicating means at its sides and also having an independent colored electric lamp at its rear end, an electric light in, and between the direction indicating means of, the device for illuminating said means; a pivotal mount at the rear end of the device whereby said device may be swung outwardly and rearwardly from its normal position, wherein the colored lamp at its rear end faces rearwardly, into a direction indicating position, wherein it extends substantially transversely of the body and the direction indicating means face forwardly and rearwardly and said colored lamp faces sidewise of and towards the body, means for swinging the device between said two positions, switch controlled means for automatically supplying current from said source to the electric light for illuminating the direction indicating means, and separate switch controlled means for supplying current from said source to said colored electric lamp.

3. The combination with an automobile having a source of current and a body, of an elongated box-like indicating device at one side of the body, adapted normally to extend longitudinally of the body and having illuminable direction indicating means at the sides thereof and also having a separate electric lamp at each of its ends, an electric light in the device for illuminating said direction indicating means, a pivotal mount for the device whereby the latter may be swung from its normal position wherein the end lamps face one forwardly and one rearwardly into a direction indicating position wherein it extends transversely of the body and the direction indicating means face forwardly and rearwardly and the end lamps face sidewise with respect to the body, means for swinging the device between said two positions, means for automatically supplying current from said source to the light for illuminating the direction indicating means when the device is swung into its direction indicating position, and separate switch controlled means for supplying current from said source to the end lamps.

AUGUST WESSIG.